United States Patent [19]

Yamanaka et al.

[11] Patent Number: 5,071,635

[45] Date of Patent: Dec. 10, 1991

[54] METHOD OF PREPARING CERAMIC MICROSPHERES

[75] Inventors: Seiji Yamanaka; Yasuyuki Ogata; Kohji Shirota, all of Chichibu, Japan

[73] Assignee: Mitsubishi Materials Corporation, Tokyo, Japan

[21] Appl. No.: 638,135

[22] Filed: Jan. 4, 1991

Related U.S. Application Data

[63] Continuation-in-part of Ser. No. 312,959, Feb. 21, 1989, abandoned.

Foreign Application Priority Data

Feb. 18, 1988 [JP] Japan .................................. 63-36239

[51] Int. Cl.$^5$ ............................................ C01B 13/18
[52] U.S. Cl. ........................................ 423/592; 501/1; 501/33; 501/103
[58] Field of Search .................... 501/33, 103; 423/592

[56] References Cited

U.S. PATENT DOCUMENTS

| | | | |
|---|---|---|---|
| 3,617,584 | 11/1971 | Flack et al. | 264/9 |
| 4,654,048 | 3/1987 | Braun et al. | 501/103 |
| 4,746,468 | 5/1988 | Ozaki et al. | 264/63 |

FOREIGN PATENT DOCUMENTS

| | | |
|---|---|---|
| 60-137827 | 7/1985 | Japan . |
| 62-262734 | 7/1987 | Japan . |

*Primary Examiner*—Theodore Morris
*Assistant Examiner*—David M. Brunsman
*Attorney, Agent, or Firm*—Toren, McGeady & Associates

[57] ABSTRACT

A manufacturing method for ceramic microspheres including the steps of; mixing an oil which is immiscible with an aqueous solution of a water-soluble metallic compound and which has a boiling point higher than that of water in the aqueous solution; applying ultrasonic vibration to the mixed solution to form a water-in-oil type emulsion; heating the emulsion at a temperature less than a boiling point of water to evaporate free water from droplets in which the water-soluble metallic compound is dissolved and to disperse spherical particles of the water-soluble metallic compound in the oil phase; and thereafter heating the dispersed solution at a temperature higher than the temperature at which the water-soluble metallic compound is decomposed to form a metallic oxide but lower than the temperature at which grain growth in the metallic oxide starts, to evaporate and decompose the oil and to remove the oil therefrom, thereby obtaining the metallic oxide microspheres.

1 Claim, No Drawings

METHOD OF PREPARING CERAMIC MICROSPHERES

This is a continuation-in-part of application Ser. No. 07/312,959, filed Feb. 21, 1989, now abandoned.

BACKGROUND OF THE INVENTION

1. Field of the Invention

This invention relates to a method of preparing ceramic microspheres, more particularly to a method of enabling preparation of true spheres with uniform particle size of submicron order without using ceramic fine powders as a starting material and adjustment of the desired mean particle size by suitably selecting a frequency of ultrasonic waves.

2. Description of the Related Art

As this kind of method, U.S. Pat. No. 4,746,468 discloses a method in which ceramic microspheres can be prepared by dispersing an aqueous suspension of ceramic fine powders as droplets in a high boiling point liquid which has substantially the same specific gravity as the suspension and which is immiscible with water and nonreactive with the ceramic fine powder. Furthermore, Japanese Unexamined Published Patent Application No. 62-262734 teaches a method in which ceramic microspheres are obtained by dispersing an alcoholic suspension or sol of ceramic fine powders as droplets in a liquid paraffin and thereafter evaporating the alcohol.

These methods are surely advantageous in that ceramic microspheres of true spheres with uniform particle size can be obtained but disadvantageous in that mean particle size of the obtained ceramic microspheres depends on the orifice bore because of dispersing the suspension of ceramic fine powders as droplets in the high boiling point liquid through the orifice. Consequently, these methods can only produce ceramic microspheres with comparative large particle size ranging from several $\mu m$ to over 10 $\mu m$.

Moreover, the above-mentioned two methods are defective in that the particle size of ceramic fine powders for forming the suspension must be always much smaller than that of the aimed ceramic microspheres and consequently ceramic fine powders produced by a special method for example an alkoxide-hydrolysis method must be used.

SUMMARY OF THE INVENTION

An object of this invention is to provide a method of preparing ceramic microspheres in a narrow particle size distribution and with mean particle size of submicron order. A further object of this invention is to provide a method of enabling preparation of ceramic microspheres with the desired mean particle size by changing the frequency of ultrasonic waves for forming a water-in-oil emulsion.

This invention provides a method of preparing ceramic microspheres which comprises the steps of; mixing an oil which is immiscible with an aqueous solution of a water-soluble metallic compound and which has a boiling point higher than that of water in the aqueous solution; applying ultrasonic vibration to the mixed solution to form a water-in-oil type emulsion; heating the emulsion at a temperature less than a boiling point of water to evaporate free water from droplets in which the water-soluble metallic compound is dissolved and to disperse spherical particles of the water-soluble metallic compound in the oil phase; and thereafter heating the dispersed solution at a temperature higher than the temperature at which the water-soluble metallic compound is decomposed to form a metallic oxide but lower than the temperature at which grain growth in the metallic oxide starts, to evaporate and decompose the oil and to remove the oil therefrom, thereby obtaining the metallic oxide microspheres.

DESCRIPTION OF THE PREFERRED EMBODIMENT

The starting material for this invention is the water-soluble metallic compound constituting the aimed ceramics. The water-soluble metallic compound is dissolved in water of a temperature in the range of from 20° C. to 50° C. to form the aqueous solution.

The oil is mixed in this aqueous solution to form the water-in-oil emulsion. If the oil is immiscible with the above aqueous solution and have a boiling point higher than that of water, the oil is not limited to a particular oil, but is preferably a paraffin oil from the viewpoint of the toxicity and the cost When forming the emulsion, it is preferable to use an emulsifier in order to keep the stability of the emulsion for many hours. The emulsifier may be any one among ionic emulsifiers, nonionic emulsifiers, and the like. Based on 100 wt. % of the aqueous solution are mixed the oil ranging from 35 wt. % to 100 wl. % and the emulsifier ranging from 1 wt. % to 6 wt. %.

One of the characteristic points in this invention is to form the emulsion by means of ultrasonic vibration. When the formation of the emulsion is accomplished by means of an agitation-type homogenizer, a pressure-type homogenizer, or the like instead of ultrasonic vibration, the droplet size does not become submicron averagely, but partially and the width of the droplet size distribution becomes wider. Consequently, the mean particle size of the ultimately obtained ceramic microspheres becomes large and irregular. Therefore, means other than ultrasonic vibration are unsuitable for this invention. The frequency of ultrasonic waves is preferably in the range of from 10 kHz to 100 kHz. Ultrasonic waves have generally a frequency higher than the audible range, i.e., higher than 20 kHz. However, even the frequency of 10 kHz can make the mean droplet size of submicron order, so that in this invention the term "ultrasonic waves" is also refers even a wave with a frequency more than 10 kHz but less than 20 kHz. When increasing the frequency to make the energy of ultrasonic waves strong, the mean particle size of the ultimately obtained ceramic microspheres becomes smaller, conversely when decreasing the frequency to make the energy of ultrasonic waves weak, the mean particle size becomes larger. From this, the mean particle size can be adjusted to the desired value by suitably selecting the frequency of the ultrasonic waves.

Although at a higher temperature water may be quickly removed from droplets, the temperature for heating the formed emulsion to thereby evaporate water from droplets in which the water-soluble metallic compound is dissolved is less than 100° C., preferably in the range of from 70° C. to 95° C., because at a temperature over 100° C. water boils.

The temperature for thermally decomposing the water-soluble metallic compound as well as for evaporating and decomposing the oil must be higher than the temperature at which the water-soluble metallic compound is decomposed to form a metallic oxide but lower than the temperature at which grain growth in the metallic oxide starts.

After the oil has been mixed in the aqueous solution of the water-soluble metallic compound, if necessary adding the emulsifier, when applying the ultrasonic vibration to the mixed solution, a strong effect of cavitation by means of ultrasonic waves is exercised upon the whole mixed solution. Thus, the above-mentioned aqueous solution is divided into droplets of submicron order to thereby disperse in the oil phase. Here, by suitably selecting a frequency of ultrasonic waves the desired mean particle size of ceramic microspheres can be settled.

Heating the emulsion to thereby evaporate free water from droplets in which the water-soluble metallic compound is dissolved, the droplets are concentrated and thereafter spherical particles of the water-soluble metallic compound are dispersed in the oil phase.

Heating the oil in which the water-soluble metallic compound has been dispersed, thereby thermally decomposing the water-soluble metallic compound as well as evaporating and decomposing the oil, microspheres of submicron order of metallic oxides are obtained.

As described in the foregoing, after forming the emulsion in which droplets of submicron order of the water-soluble metallic compound are dispersed in the oil phase by means of ultrasonic vibration, ceramic microspheres in this invention are prepared by heating the emulsion to thereby remove the water and the oil. Consequently, true spheres can be obtained without using ceramic fine powders as a starting material.

Particularly, because emulsifying is accomplished by ultrasonic vibration and the temperature for evaporating and decomposing the oil is lower than the temperature at which grain growth in the metallic oxide starts, the obtained particles do not agglomerate, but only come into point-contact mutually. Furthermore, the obtained particles have a mean particle size of submicron order and become ceramic microspheres in a narrow particle size distribution. Moreover, by suitably selecting a frequency of ultrasonic waves, the mean particle size of microspheres is adjustable to the desired value.

This invention will be described more specifically referring to the following examples.

EXAMPLE 1

10 g of $ZrO(NO_3)_2 \cdot 2H_2O$ was dissolved in 25g of 40° C. water to thereby form an aqueous solution. After 50/g of a paraffin oil and 1 g of polyoxyethylene-nonylphenyl-ether as an emulsifier were mixed in the aqueous solution, the ultrasonic vibration was applied to the mixed solution for 15 seconds by means of the ultrasonic generator (B-30 type of Branson Co., Ltd.) to thereby form a water-in-oil emulsion. Here, the frequency of ultrasonic waves was 30 kHz. The thus obtained emulsion was placed in the drier and dried at 80° C. and under atmospheric pressure for 8 hours, thereby evaporating and removing water. The emulsion became a suspension in which $ZrO_2$ particles are dispersed. The suspension was calcined at 700° C. and under atmospheric pressure for 3 hours and thereafter the oil was decomposed and removed, thereby obtaining $ZrO_2$ spheres. Observation by means of scanning electron microscope indicated that the thus obtained spheres were extremely fine, uniform, and monodispersed ceramic microspheres of $ZrO_2$ whose mean particle size was 0.1 $\mu$m and whose width of particle size distribution was $\pm 0.02$ $\mu$m.

EXAMPLE 2

In the same manner as described in Example 1 except using the aqueous solution in which 5.34 g of $ZrO(NO_3)_2 \cdot 2H_2O$ and 6.76 g of $Pb(CH_3COO)_2 \cdot 3H_2O$ were dissolved in 25 g of 40° C. water, $PbZrO_3$ spheres were obtained. Observation in the same manner as in Example 1 indicated that the thus obtained spheres were extremely fine, uniform, and monodispersed ceramic microspheres of $PbZrO_3$ whose mean particle size was 0.1 $\mu$m and whose width of particle size distribution was $\pm 0.02$ $\mu$m, i.e., the same value as in Example 1.

EXAMPLE 3

In the same manner as described in Example 1 except changing the frequency of ultrasonic waves into 10 kHz, $ZrO_2$ spheres were obtained. Observation in the same manner as in Example 1 indicated that the thus obtained spheres were monodispersed ceramic microspheres of $ZrO_2$ whose mean particle size was 0.7 $\mu$m slightly larger than that in Example 1 and whose width of particle size distribution was $\pm 0.11$ $\mu$m also slightly wider than that in Example 1.

EXAMPLE 4

In the same manner as described in Example 1 except changing the frequency of ultrasonic waves into 100 kHz, $ZrO_2$ spheres were obtained. Observation in the same manner as in Example 1 indicated that the thus obtained spheres were monodispersed ceramic microspheres of $ZrO_2$ whose mean particle size was 0.02 $\mu$m much smaller than that in Example 1 and whose width of particle size stribution was $\pm 0.003$ $\mu$m also much narrower than that in Example 1.

COMPARATIVE EXAMPLE 1

In the same manner as described in Example 1 except forming the emulsion by means of the agitation type homogenizer, $ZrO_2$ spheres were obtained. Observation in the same manner as in Example 1 indicated that the thus obtained spheres were ceramic microspheres of $ZrO_2$ whose width of particle size distribution was in the range of from 0.1 $\mu$m to 3 $\mu$m wider than that in Example 1.

COMPARATIVE EXAMPLE 2

In the same manner as described in Example 2 except forming the emulsion by means of the pressure-type homogenizer, $PbZrO_3$ spheres were obtained. Observation in the same manner as in Example 1 indicated that the thus obtained spheres were ceramic microspheres of $PbZrO_3$ whose width of particle distribution size was in the same range of from 0.1 $\mu$m to 3 $\mu$m as that in Comparative Example 2.

What is claimed is:

1. A method of preparing ceramic microspheres in the form of a metal oxide powder comprising
   (a) forming a water-in-oil type emulsion consisting essentially of oil, water, and emulsifier and water-soluble metal compound by the steps of:
      dissolving said water-soluble metal compound in water to form an aqueous solution of said metal compound,
      mixing an oil which is immiscible with said aqueous solution and which has a boiling point higher than that of water in said aqueous solution together with an emulsifier and applying ultrasonic vibration with a frequency in the range of from 10 kHz to 100 kHz to the resultant mixture to form the water-in-oil type emulsion, thereby obtaining droplets in which said metal compound is dissolved;

(b) evaporating free water from said droplets by heating said emulsion at a temperature less than a boiling point of water to form a suspension of spherical particles of said metal compound as a dispersed phase and oil as the dispersion medium; and (c) thereafter removing said oil from said suspension by heating the suspension at a temperature higher than the temperature at which said metal compound is decomposed to form a metal oxide but lower than the temperature at which grain growth in said metal oxide starts, thereby obtaining said metal oxide powder.

* * * * *